United States Patent [19]

Pratt

[11] Patent Number: 5,002,670

[45] Date of Patent: Mar. 26, 1991

[54] CHEMICAL WASTE TREATMENT

[75] Inventor: Jack B. Pratt, Malvern, Pa.

[73] Assignee: Crane Company, Chicago, Ill.

[21] Appl. No.: 384,560

[22] Filed: Jul. 24, 1989

[51] Int. Cl.$^5$ .......................... C02F 1/42; C02F 1/66
[52] U.S. Cl. .................................. 210/668; 210/669; 210/670; 210/919
[58] Field of Search ............... 210/668, 669, 919, 670

[56] References Cited

U.S. PATENT DOCUMENTS

| | | | |
|---|---|---|---|
| 144,737 | 11/1873 | Burgess | 210/919 |
| 1,672,586 | 6/1928 | Travers | 210/919 |
| 3,062,739 | 11/1962 | Crits | 210/672 |

Primary Examiner—Ivars Cintins
Attorney, Agent, or Firm—Woodcock Washburn Kurtz Mackiewicz & Norris

[57] ABSTRACT

A method for continuously neutralizing quantities of acidic and alkaline waste materials is disclosed. Acidic and alkaline quantities are successively passed through the same weak ion exchanger. The passage of each of the quantities effectively neutralizes that quantity in the ion exchanger while, at the same time, effectively regenerates the exchanger for use in neutralizing the next successive quantity of waste material passed therethrough. Relatively highly acidic and highly alkaline waste materials are first neutralized in a holding vessel before being passed into the ion exchanger.

16 Claims, 1 Drawing Sheet 5,002,670

CHEMICAL WASTE TREATMENT

BACKGROUND OF THE INVENTION

This invention relates to the treatment of chemical wastes to approximately neutral or at least acceptable effluent to sewers, streams, or the like.

In many operations, such as chemical laboratories, chemical manufacturing, metal cleaning and finishing, water treatment, or the like, periodic alternate discharges of strong acid and strong alkalis are necessary. In other similar cases, large volumes of dilute acids and alkalis are discharged in alternation. In many instances, over an extended period of a day, a week, or more, the amount of acid and the amount of alkali are approximately equivalent, that is, if all of the wastes were impounded they would be, to a considerable extent, self-neutralizing. Impounding of large quantities of such wastes in acid-resistant vessels is expensive. Furthermore, these large vessels are located centrally or at a distance from the waste source, and long runs of acid-resistant piping are required at very substantial expense. The mutual neutralization is, of course, generally less expensive than the addition of purchased acid to neutralize alkaline waste when that occurs and purchased alkali to neutralize acid waste when that is flowing. This last procedure, furthermore, requires modulating type chemical feeders for both acid and alkali and extensive instrumentation for control of these. Therefore, despite its disadvantages self-neutralization has been employed.

It will be evident that in this procedure of self-neutralization, large storage spaces are required simply because of the amount of water associated with the waste flows, that is, the size of the storage space is not determined by the amounts of acid or alkali as such. In fact, the volume of storage space required varies inversely with the concentrations involved, more storage space per unit quantity of acid or alkali being required when the concentrations are low. Obviously, the storage space is also determined by the number of cycles desired to be self-neutralized in a given period of time and rate of flow of the liquid waste streams involved.

The ultimate objective of the neutralization is to maintain the ultimate effluent to a sewer or stream acceptable. Generally, relatively low ultimate acidity is permissible, and while greater amounts of alkalinity are often acceptable, there are frequent limitations even on the permissible alkalinity. The net result of this situation, therefore, is not only a requirement for large storage or impounding volume but the provision of acid or alkali feed to achieve a better approach to neutrality than is achieved by the self-neutralizing aspect of the procedure.

In Crits, U.S. Pat. No. 3,062,739, granted Nov. 6, 1962, there is disclosed a method of continuously neutralizing successively generated quantities of acidic and alkaline waste materials comprising the steps of successively passing said acidic and alkaline quantities through the same weak ionic exchanger in the order in which they are generated. The passage of each of said quantities effectively neutralizes that quantity while, at the same time, effectively regenerates said exchanger for use in neutralizing the passage of the subsequently generated quantity of waste material.

The use of weakly acidic cation exchange resins as described in the Crits patent depends upon establishing the volume of weakly acidic resin in the ion exchanger on the basis of the total pounds of acid or alkali fed at any one time.

SUMMARY OF THE INVENTION

The ion exchange resin used in a neutralization ion exchanger is quite expensive and it is desirable to minimize the quantity required. This invention is an improvement in the method of the Crits patent which improvement permits the ion exchanger to be sized on hydraulic and kinetic considerations and used to treat small mass quantities of dilute acid and alkali wastes and previously treated batch-concentrated wastes where self-neutralization has been almost completely accomplished.

This invention is more particularly pointed out and distinctly claimed in the appended claims and is described in its preferred embodiments in the accompanying drawing and the following detailed description.

DETAILED DESCRIPTION OF THE INVENTION

Figure 1:
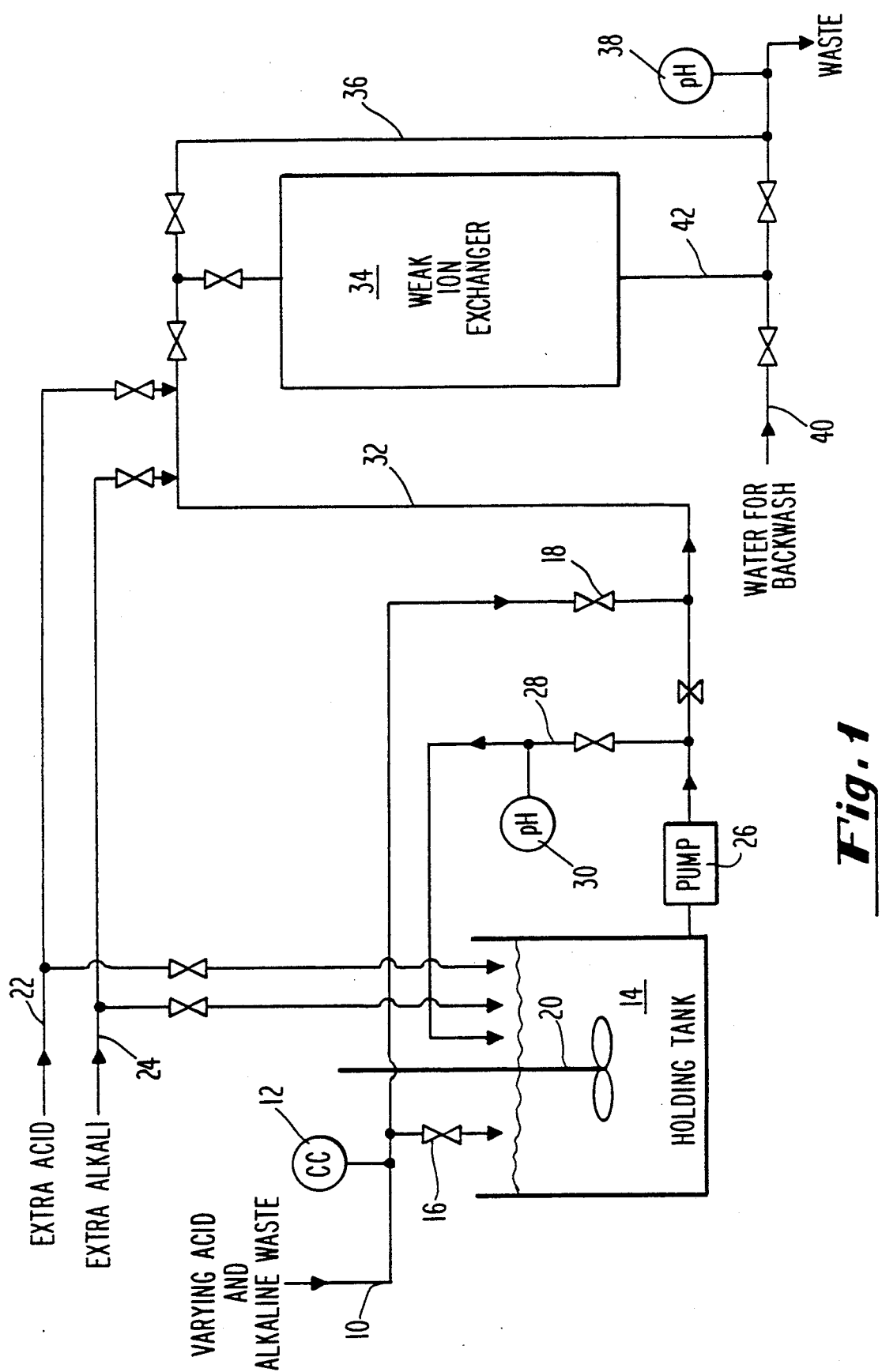
FIG. 1 is a schematic diagram of a flow chart of the neutralization method of this invention.

As pointed out above, this invention is an improvement in the method of Crits, U.S. Pat. No. 3,062,739, the entire teachings of which are incorporated herein by reference.

For simplicity in the following description, the term "neutral" is to be construed as referring to such approximation to neutrality as will be acceptable in an ultimately produced effluent. In this sense, "neutral" may be interpreted as applied to an effluent having a pH ranging from around 6 to 9, though in numerous instances pH values outside of this range are tolerable. Additionally, for the sake of simplicity, where reference is made to pounds of alkali or acid it will be understood that the pounds referred to relate to equivalent calcium carbonate, as is customary in the water treatment.

The wastes treated by the method of this invention may come from a conventional demineralizer where there is a cyclical repetition of flow of acid and alkali wastes, but may come from other sources as well.

Referring now to the flowsheet in FIG. 1, varying acidic and alkaline waste is introduced through line 10 and is continuously monitored for high acidity or alkalinity by a pH measuring device 30. Suitable such devices are obtained from Beckman Instruments, Myron Instrument Co., Leeds & Northrop, Signet, etc. A pH greater than about 11 or less than about 3, would indicate that the waste should be diverted to holding tank 14 through valve 16 and valve 18 would be closed. The holding tank is shown equipped with a mixer 20, but it can be a vessel of any shape or size that would accomplish the purpose described herein.

The highly acidic (or alkaline) waste is usually retained in the tank 14 until it is mixed with a highly alkaline (or acidic) waste to effect neutralization. It may, however, be mixed with fresh acid or alkali through lines 22 or 24 and monitored by a suitable pH/controller if desired. The degree of neutralization is optional but is normally to a pH between about 3 and 11. More particularly, the neutralized waste can be made weakly alkaline, e.g., to a pH between about 8 and 11, or weakly acidic, e.g., pH between about 3 and 5.

The neutralized waste in tank 14 is either recycled by pump 26 through line 28 containing pH meter 30 or if the pH is appropriate, pumped through line 32 into the weakly acidic cation exchanger 34.

If the varying acidic and alkaline waste in line 10 is sufficiently weak or neutral, it can be passed through valve 18 and line 32 directly into exchanger 34. The feed to the exchanger 34 should either be neutral or alternately weakly acidic and weakly basic so as to neutralize the quantity in the exchanger and to regenerate the ion exchange resin therein for use in neutralizing the next quantity of waste material passed therethrough. The teachings of the Crits patent relative to the ion exchanger and its operation and uses are specifically incorporated herein by reference. Suitable ion exchange resins are any weakly acidic cation exchanger such as IRC-84, IRC-50, Duolite 464, Ionac CC, etc. In the operation of this invention it is suggested that an exchanger that contains about 80 Kg/cu-ft (as $CaCO_3$) capacity be used.

The material exiting from the exchanger 34 can be recycled back through line 36 or passed to waste if the pH measured by meter 38 is sufficiently neutral. Likewise if the material exiting the tank 14 or coming in through line 10 is sufficiently neutral, it can by-pass the exchanger 34 and be passed to waste through line 36.

Ordinarily, the batch waste from holding tank 14 will be the last waste to be passed through the exchanger 34 after the dilute backwash and rinse wastes from the regeneration of the dimineralizer. The exchanger 34 may be back-washed by water through lines 40 and 42 and flushed through line 36 to waste.

By batch neutralizing the large quantities of either acid or caustic waste or both before routing it into the exchanger 34, only small mass quantities of acid or caustic remain. Thus, the quantity or size of the ion exchange resin need not be based on the total mass quantity of acid and/or caustic (as required by the practice of the Crits patent).

I claim:

1. In a method of continuously neutralizing quantities of acidic and alkaline waste materials comprising the steps of successively passing acidic and alkaline quantities through the same weak ion exchanger, the passage of each of said quantities effectively neutralizing that quantity in said ion exchanger while, at the same time, effectively regenerating said exchanger for use in neutralizing the next successive quantity of waste material passed therethrough, the improvement wherein relatively highly acidic and highly alkaline waste materials are first neutralized in a holding vessel before being passed into said ion exchanger.

2. The method of claim 1 wherein said weak ion exchanger is a weakly acidic ion exchanger.

3. The method of claim 1 wherein said highly alkaline waste material has a pH of about 11 or greater.

4. The method of claim 1 wherein said highly acidic waste material has a pH of about 3 or less.

5. The method of claim 1 wherein said waste materials in said holding vessel are neutralized to a pH between about 3 and about 11.

6. The method of claim 5 wherein said waste materials in said holding vessel are neutralized to a pH between about 3 and 5 and are passed to said exchanger between successive quantities of alkaline waste material.

7. The method of claim 5 wherein said waste materials are neutralized in said holding vessel to a pH between about 8 and 11 and are passed to said exchanger between successive quantities of acidic waste material.

8. The method of claim 1 wherein the neutralization in said holding vessel is carried out by mixing with freshly added acid or freshly added caustic.

9. The method of claim 1 wherein the neutralization of highly acidic waste material in said holding vessel is carried out by the mixing with a quantity of highly alkaline waste material.

10. The method of claim 1 wherein the neutralization of highly alkaline waste material in said holding vessel is carried out by mixing with a quantity of highly acidic waste material.

11. In a method of continuously neutralizing successively generated quantities of acidic and alkaline waste materials comprising the steps of successively passing weakly acidic and weakly alkaline quantities through the same weakly acidic cation exchanger, the passage of each of said quantities effectively neutralizing that quantity in said ion exchanger while, at the same time, effectively regenerating said exchanger for use in neutralizing the next successive quantity of waste material passed therethrough, the improvement wherein highly acid waste materials having a pH of about 3 or less and highly alkaline waste materials having a pH of about 11 or greater are first neutralized in a holding vessel to a weakly acidic or a weakly alkaline pH before being passed into said exchanger.

12. The method of claim 11 wherein the neutralization of highly acidic waste material in said holding vessel is carried out by the mixing with a quantity of highly alkaline waste material.

13. The method of claim 11 wherein the neutralization of highly alkaline waste material in said holding vessel is carried out by mixing with a quantity of highly acidic waste material.

14. The method of claim 11 wherein the neutralization in said holding vessel is carried out by mixing with freshly added acid or freshly added caustic.

15. The method of claim 11 wherein said waste materials in said holding vessel are neutralized to a pH between about 3 and 5 and are passed to said exchanger between successive quantities of alkaline waste material.

16. The method of claim 11 wherein said waste materials are neutralized in said holding vessel to a pH between about 8 and 11 and are passed to said exchanger between successive quantities of acidic waste material.

* * * * *